US009470035B2

(12) United States Patent
Denny

(10) Patent No.: US 9,470,035 B2
(45) Date of Patent: Oct. 18, 2016

(54) MODULE MOUNTING

(71) Applicant: NCR CORPORATION, Duluth, GA (US)

(72) Inventor: Ian M Denny, Perth (GB)

(73) Assignee: NCR CORPORATION, Duluth, GA (US)

(*) Notice: Subject to any disclaimer, the term of this patent is extended or adjusted under 35 U.S.C. 154(b) by 0 days.

(21) Appl. No.: 13/718,579

(22) Filed: Dec. 18, 2012

(65) Prior Publication Data

US 2014/0165885 A1 Jun. 19, 2014

(51) Int. Cl.
*G06Q 40/00* (2012.01)
*G07D 11/00* (2006.01)
*E05G 1/024* (2006.01)

(52) U.S. Cl.
CPC .......... *E05G 1/024* (2013.01); *Y10T 29/49826* (2015.01)

(58) Field of Classification Search
CPC .... G07F 19/20; G07F 19/205; G07F 19/203; G07D 11/0081; G07D 11/0003; G07D 11/0009; E05F 15/142; E05Y 2201/722; B60P 1/00
USPC ................................ 235/379, 383, 486, 381
See application file for complete search history.

(56) References Cited

U.S. PATENT DOCUMENTS

| | | | | |
|---|---|---|---|---|
| 3,494,113 | A * | 2/1970 | Kinney | 55/481 |
| 4,462,506 | A * | 7/1984 | Ohba | 221/13 |
| 2005/0029341 | A1* | 2/2005 | Magee et al. | 235/379 |
| 2005/0269397 | A1* | 12/2005 | Shepley et al. | 235/379 |
| 2009/0242626 | A1* | 10/2009 | Jones et al. | 235/379 |
| 2013/0030998 | A1* | 1/2013 | Colley | G07F 19/20 705/43 |

* cited by examiner

*Primary Examiner* — Tuyen K Vo
(74) *Attorney, Agent, or Firm* — Schwegman, Lundberg & Woessner

(57) ABSTRACT

A method and apparatus are disclosed for mounting to the side of a safe enclosure housing of a Self-Service Terminal (SST), such as an Automated Teller Machine (ATM). The apparatus comprising a plurality of sheet portions arranged to define an outer housing, and a plurality of elongate reinforcement portions connected together to form at least one closed reinforcement assembly provided inside the outer housing for supporting the outer housing.

15 Claims, 8 Drawing Sheets

MODULE MOUNTING

FIELD OF THE INVENTION

The present invention relates to a method and apparatus for mounting a housing to the side of Self-Service Terminal (SST), such as an Automated Teller Machine (ATM). In particular, but not exclusively, the present invention relates to how a relatively lightweight but strong housing that can be sued to house auxiliary equipment can be mounted on a side of the SST.

Known SSTs include a number of modules housed in a main safe enclosure housing. Such modules include a controller module, customer display and/or keypad, card read/write module, printer module, cash dispenser module, journal printer module and operator panel module, or other such auxiliary equipment, for example. Often additional modules are desired to extend the functionality of the SST and these are typically provided externally of the main safe enclosure housing. Additional modules are typically of low value, such as a printer or coin module, rather than a high value module, such as a bank note container or dispenser, which must be housed inside the main safe enclosure housing of the SST.

It is known to house such additional modules in a standard housing which is mounted to an outer surface of the safe enclosure housing of a SST. A known standard housing is a so-called 'top box' which is mounted to an upper surface of the safe enclosure housing of a SST. Another known standard housing is a so-called 'sidecar' which is mounted to a side of the safe enclosure housing of a SST.

Known standard housings are undesirably heavy and are individually mounted to the safe enclosure housing. Heavy top boxes require sufficient space above the SST and subject the safe enclosure housing to excessive loading which can result in fatigue or fracture of the safe enclosure housing overtime. Heavy side cars subject the safe enclosure housing to unbalanced and excessive loading which can result in fatigue or fracture of the safe enclosure housing overtime. In light of their weight and construction, known side cars engage with a surface on which the SST is mounted, such as the floor, for support. However, where such a surface is not level, the safe enclosure housing is subjected to further stress and undesirable loading. As a result, the safe enclosure housing and/or side car can become distorted. Such distortion is visibly unappealing to a customer and can cause misalignment problems between modules and openings in a side car and/or a user interface of the SST. Furthermore, such distortion may cause misalignment between a SST and a side car itself. A result of such a misalignment problem may be a media jam where, for example, a media slot of a user interface is misaligned with a corresponding opening in a module housed in the safe enclosure housing of SST.

Furthermore, known standard housings are designed to house and mount a specific module to a specific surface of the safe enclosure housing of a SST. Bespoke hardware must therefore be used to mount a standard housing to a specific surface of the safe enclosure housing and in a specific position. The standard housing is intended to be fixed in position and if a module requires replacing with a differently configured and/or sized module, a new standard housing specific to the new module must be provided and suitable hardware must be used to mount the new standard housing to the safe enclosure housing. In a similar manner, where it is desired to move a standard side car to an opposite side of an ATM or SST to which it is mounted, a correctly configured side car housing is required to provide such a desired configuration. These problems are undesirably costly and time consuming to solve.

Furthermore, SST systems that include a safe enclosure housing and at least one standard housing for an additional module are particularly specific to a customer's requirements. The standardised housings for additional modules are tightly integrated into a SST system and are typically shipped in an assembled state to the customer. This increases shipping costs and makes manoeuvring and installing the SST system particularly difficult. For example, manoeuvring such a system through doorways and up or down stairs is particularly difficult and often hazardous.

SUMMARY OF THE INVENTION

It is an aim of the present invention to at least partly mitigate one or more of the above-mentioned problems.

It is an aim of certain embodiments of the present invention to provide a structurally rigid and lightweight apparatus for mounting to the side of a SST, such as an ATM, that can be spaced apart from a surface on which the SST is mounted.

It is an aim of certain embodiments of the present invention to provide apparatus for mounting to the side of a SST, such as an ATM, in a number of different possible orientations and configurations with respect to the SST and/or a surface on which the SST is mounted.

It is an aim of certain embodiments of the present invention to provide apparatus and a mounting methodology for mounting to the side of a SST, such as an ATM, which can be shipped, manoeuvred and/or installed whilst mounted to the SST or be easily separated for shipping, manoeuvring and/or installing.

According to a first aspect of the present invention there is provided apparatus for mounting to the side of a safe enclosure housing of a Self-Service Terminal (SST), comprising:

- a plurality of sheet portions arranged to define an outer housing; and
- a plurality of elongate reinforcement portions connected together to form at least one closed reinforcement assembly provided inside the outer housing for supporting the outer housing.

Aptly, the at least one reinforcement assembly comprises at least two reinforcement assemblies longitudinally spaced apart inside the outer housing.

Aptly, the plurality of elongate reinforcement portions define at least one closed polygonal reinforcement assembly.

Aptly, the at least one reinforcement assembly comprises substantially parallel and spaced apart upper and lower reinforcement portions and substantially parallel and spaced apart opposing side reinforcement portions.

Aptly, the side reinforcement portions are greater in length than the upper and lower reinforcement portions.

Aptly, each reinforcement portion has an open channel cross-section comprising a base portion and opposing side wall portions extending from the base portion to a channel opening.

Aptly, the base portion and channel opening of a lower reinforcement portion are further spaced apart than the corresponding base portions and channel openings of a remainder of the reinforcement portions of the at least one reinforcement assembly.

Aptly, each reinforcement portion comprises at least one outwardly extending flange at its channel opening for supporting a sheet portion of the outer housing.

Aptly, each side reinforcement portion comprises at least one aperture for selectively mounting the apparatus in a forward facing orientation to one or both sides of a safe enclosure housing of a SST.

Aptly, each side reinforcement portion comprises a plurality of longitudinally spaced apart apertures for selectively mounting the apparatus to a safe enclosure housing of a SST at respective heights from a surface on which the safe enclosure housing is mounted.

Aptly, each side reinforcement portion comprises a plurality of longitudinally spaced apart apertures for supporting a shelf, tray and/or module.

Aptly, the module comprises one or more of a printer, coin module or computing device.

Aptly, the apparatus further comprises a closure member hingedly mounted to the outer housing and arranged to be flush with a side surface of the safe enclosure housing on which the apparatus is mounted when the closure member is in an open position relative to the outer housing.

According to a second aspect of the present invention there is provided a system comprising a Self-Service Terminal (SST) and at least one apparatus mounted to at least one side of the SST, wherein the apparatus comprises:

- a plurality of sheet portions arranged to define an outer housing; and
- a plurality of elongate reinforcement portions connected together to form at least one closed reinforcement assembly provided inside the outer housing for supporting the outer housing.

Aptly, the apparatus is spaced apart from a surface on which the SST is mounted.

According to a third aspect of the present invention there is provided an assembly comprising a plurality of the systems, wherein each system comprises a Self-Service Terminal (SST) and at least one apparatus mounted to at least one side of the SST, wherein the apparatus comprises:

- a plurality of sheet portions arranged to define an outer housing; and
- a plurality of elongate reinforcement portions connected together to form at least one closed reinforcement assembly provided inside the outer housing for supporting the outer housing.

Aptly, the plurality of the systems are arranged adjacent to each other in a radial formation to define an inwardly or outwardly curving arrangement.

Aptly, each system comprises an intermediate wedge-shaped portion provided between each apparatus and a safe enclosure housing to which it is mounted to allow for said radial formation.

According to a fourth aspect of the present invention there is provided a method of manufacturing apparatus for mounting to the side of a safe enclosure housing of a Self-Service Terminal (SST), comprising:

- providing a plurality of elongate reinforcement portions;
- connecting the reinforcement portions to form at least one closed reinforcement assembly; and
- attaching at least one sheet portion to each reinforcement portion to form an outer housing to be supported by the at least one closed reinforcement assembly.

Aptly, the method further comprises the step of mounting the apparatus to a side of a safe enclosure housing of a SST and/or to a further apparatus mounted to the side of a safe enclosure housing of a SST, wherein the further apparatus comprises:

- a plurality of sheet portions arranged to define an outer housing; and
- a plurality of elongate reinforcement portions connected together to form at least one closed reinforcement assembly provided inside the outer housing for supporting the outer housing.

Aptly, the method further comprises spacing apart the apparatus from a surface on which the SST is mounted.

According to a fifth aspect of the present invention there is provided apparatus for mounting to the side of an enclosure, comprising:

- an outer housing; and
- at least one inner reinforcement assembly for supporting the outer housing from the enclosure and thereby spacing the apparatus apart from a surface on which the enclosure is mounted.

Certain embodiments of the present invention provide the advantage that apparatus to house at least one additional module to those housed in an a SST, such as an ATM, can be mounted to a side of a safe enclosure housing of the SST and spaced apart from the ground.

Certain embodiments of the present invention provide the advantage that additional modules can be mounted (in a housing) to the right and/or left side of a safe enclosure housing of a SST, such as an ATM.

Certain embodiments of the present invention provide the advantage that more than one apparatus according to the present invention can be mounted to a side of a safe enclosure housing of a SST, such as an ATM.

Certain embodiments of the present invention provide the advantage that apparatus to house at least one additional module can be selectively mounted to a safe enclosure housing of a SST at respective heights from a surface on which the enclosure is mounted. This allows for an apparatus to be selectively mounted to one or more sides of a SST at a respective height for a particular customer in a particular country.

Certain embodiments of the present invention provide the advantage that apparatus to house at least one additional module can be selectively mounted to an existing safe enclosure housing of an ATM or SST which is already in situ. This allows for the apparatus to be shipped separately thereby reducing shipping costs and making manoeuvring and installing the apparatus quicker and easier.

Certain embodiments of the present invention provide the advantage that apparatus to house at least one additional module can be easily shipped, manoeuvred and/or installed when mounted to a SST or when separated from the SST. If shipped/transported separately the housing can subsequently be secured to the SST.

BRIEF DESCRIPTION OF DRAWINGS

Embodiments of the present invention will now be described hereinafter, by way of example only, with reference to the accompanying drawings in which.

DESCRIPTION OF EMBODIMENTS

Figure 1:
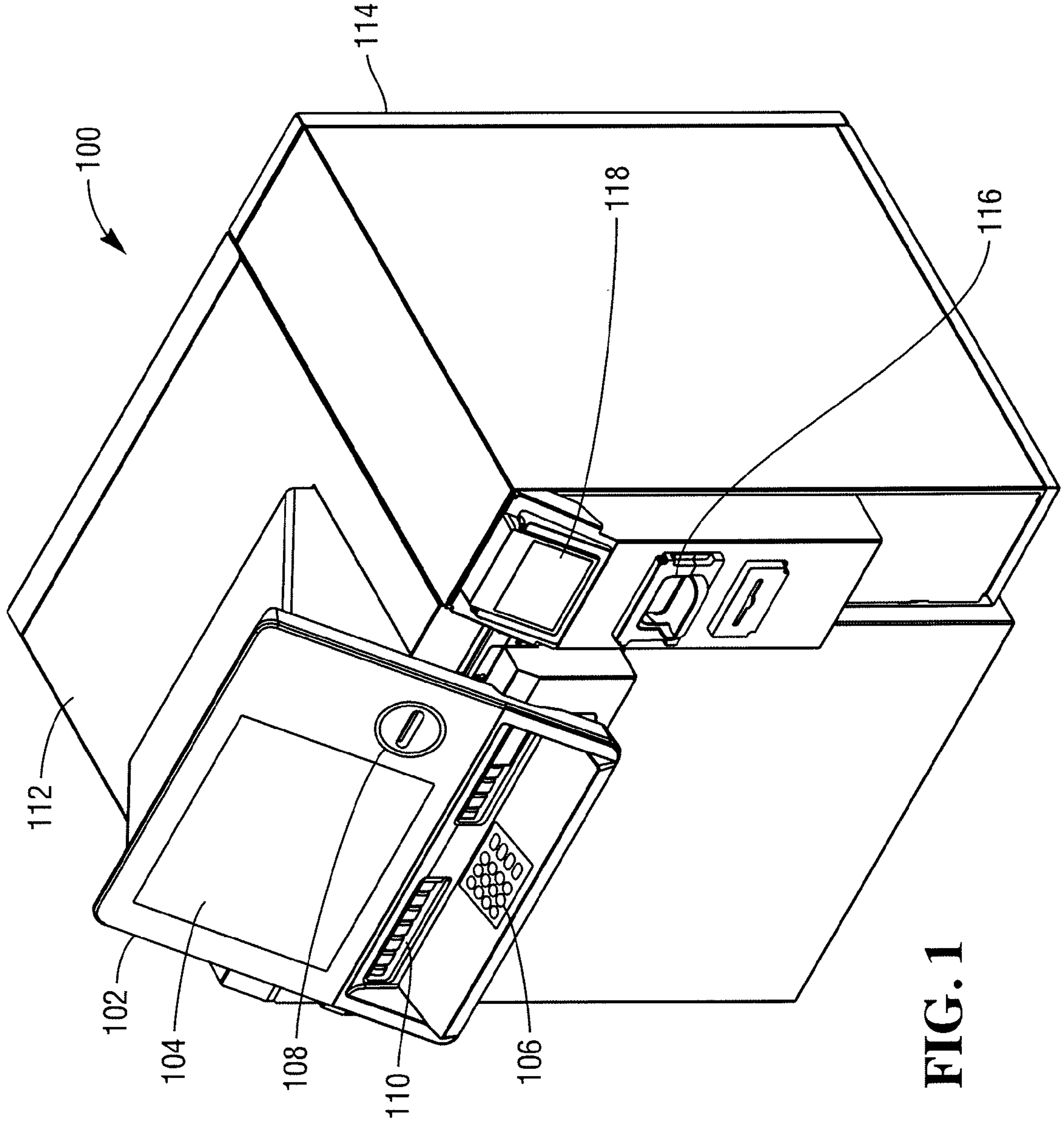
FIG. 1 illustrates a Self-Service Terminal (SST) and apparatus according to the present invention mounted to the right-hand side of the SST enclosure housing.

In the drawings like reference numerals refer to like parts.

FIG. 1 illustrates a Self-Service Terminal (SST) 100, such as an ATM, having a user interface 102 including a screen 104, keypad 106, card reader 108 and media dispenser 110. Respective modules for these components are housed in a safe enclosure housing 112 of the SST. Additional functionality is provided by way of an additional module housed in a housing or so-called 'side car' 114 mounted to the right-hand side of the safe enclosure housing 112 of the SST. The side car 114 is mounted in a front facing configuration with respect to the user interface of the SST. The additional module housed in the side car 114 includes a receipt printing device 116 and screen 118. Of course, the additional module may include one or more of other such modules including, for example, a controller module, customer display and/or keypad, card read/write module, printer module, cash dispenser module, journal printer module and operator panel module.

Figure 2:
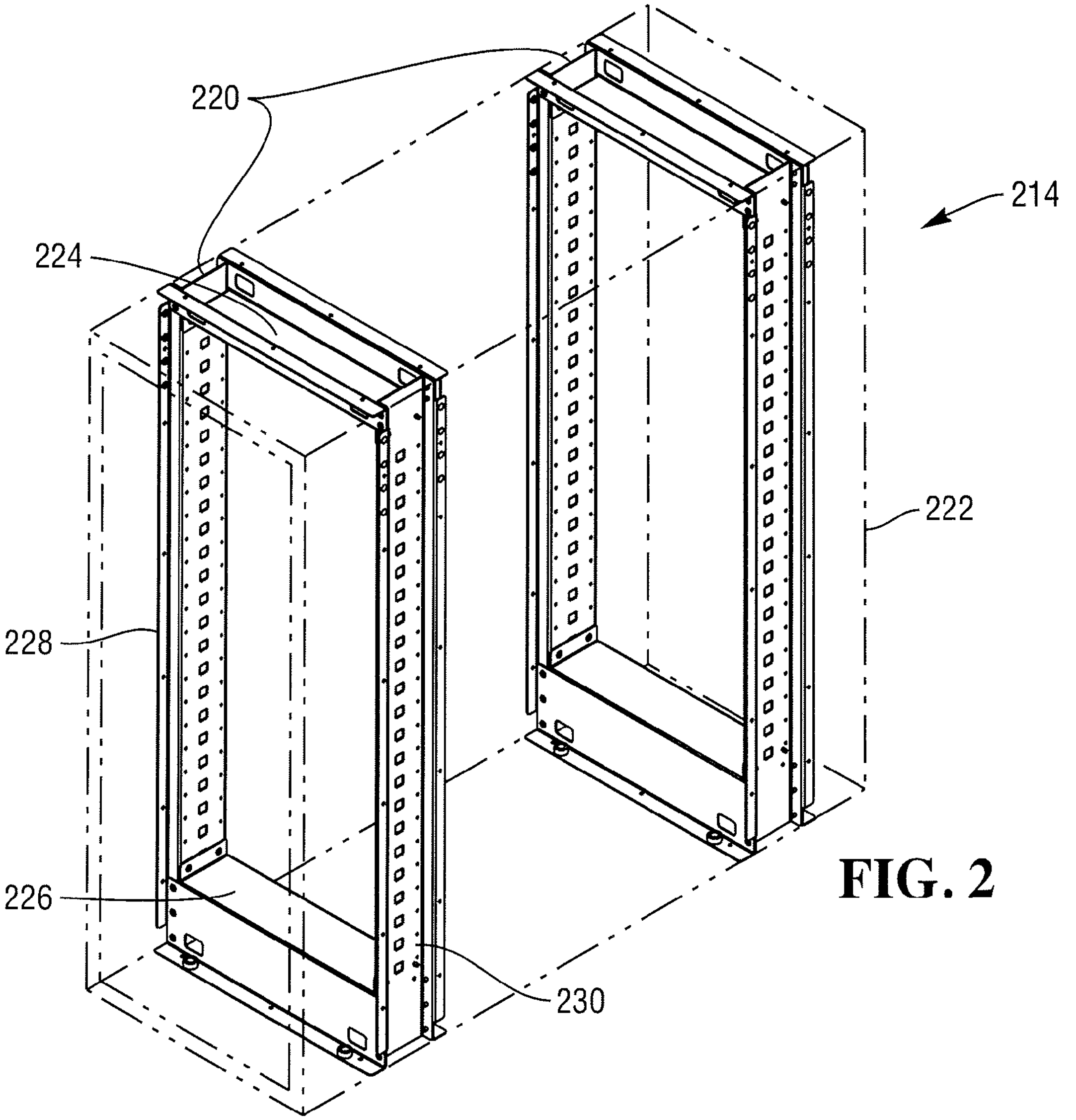
FIG. 2 illustrates the apparatus of FIG. 1 and shows the internal reinforcement assemblies.

As shown in FIG. 2, a side car 214 according to the present invention has two spaced apart reinforcement assemblies 220 which support a plurality of sheet portions to define an outer housing 222. The outer housing 222 has top and bottom sheet portions, a pair of side sheet portions and front a rear sheet portions defining a closed outer housing 222. The rear sheet portion may include a cover hingedly attached to a side sheet portion to move between open and closed positions to provide access inside the outer housing. The cover is configured to be flush with the side of the SST or an adjacent side car when the cover is in an open position. This provides maximum access into the side car. Such access may be desirable for installing or removing a module from the side car 214, updating software, replenishing consumables and/or performing maintenance, for example.

Figure 3:
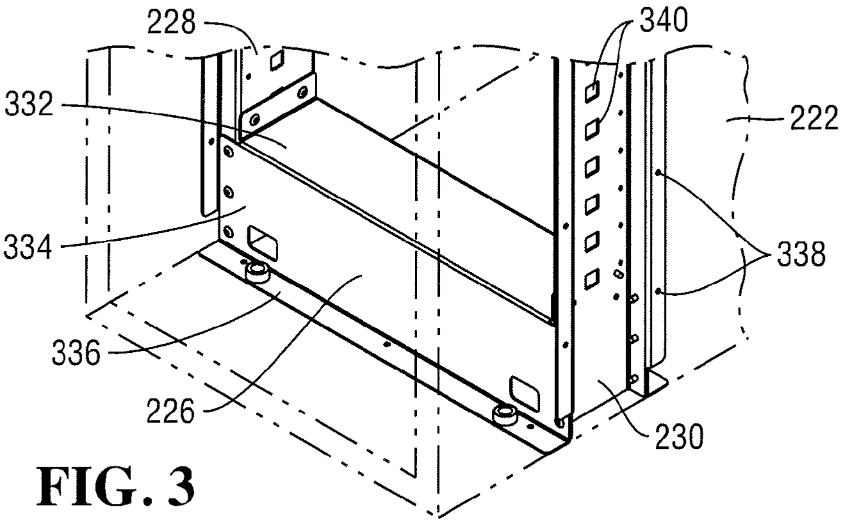
FIG. 3 illustrates a lower reinforcement portion of a reinforcement assembly as shown in FIG. 2.

Each reinforcement assembly 220 is a closed structure being made up of upper and lower elongate portions 224, 226 and a pair of opposing side reinforcement portions 228, 230. As shown best in FIG. 3, each reinforcement portion has a channel cross section having a base 332 and opposing side walls 334 extending from the base. Each side wall 334 terminates with an outwardly extending flange 336. Each flange 336 has a number of apertures for riveting each separate sheet portion of the outer housing 222 to a respective reinforcement portion 224, 226, 228, 230.

The reinforcement portions 224, 226, 228, 230 have a material thickness which is greater than a material thickness of the sheet portions of the outer housing 222. The sheet portions have a thickness of from 1.0 mm to 3.0 mm. Aptly the thickness is from 1.2 mm to 1.5 mm. The sheets to form the outer housing 222 are a metal material, such as steel or aluminium, although it will be appreciated that other rigid materials could be used. The reinforcement portions have a greater thickness and are also a metal material, such as steel or aluminium, but it will be appreciated that other suitable materials may be used. It will also be appreciated that the outer housing 222 may be formed from a single sheet web or may be formed from individual sheet portions riveted or welded together, for example.

The lower reinforcement portion 226 of each reinforcement assembly 220 has a greater channel depth than the other reinforcement portions of the same reinforcement assembly. In other words, a channel opening of the lower reinforcement portion 226 is spaced further from its respective base than corresponding base portions and channel openings of a remainder of the reinforcement portions of the same reinforcement assembly. This provides increased strength and torsional stiffness to each closed reinforcement assembly, particularly when the side car 214 is spaced apart from a surface, e.g. a floor, on which the SST is mounted.

Figures 4A, 4B, 4C:
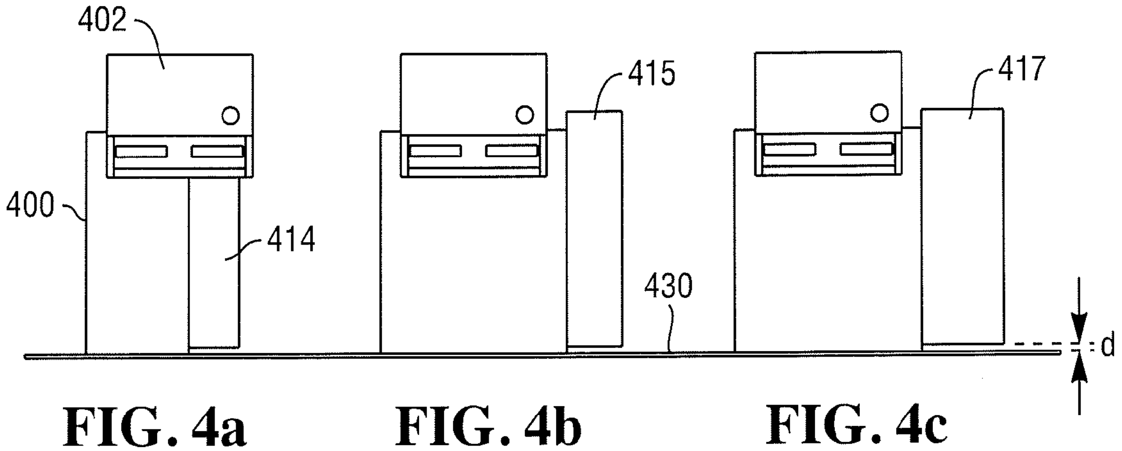
FIGS. 4*a* to 4*g* illustrate different configurations of the apparatus shown in FIG. 2 with respect to a SST on which it is mounted.
Figures 4D, 4E, 4F:
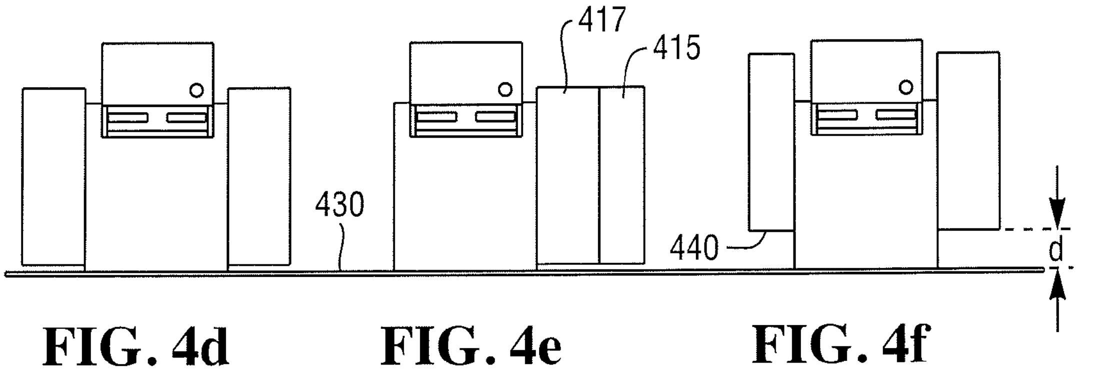
Figure 4G:
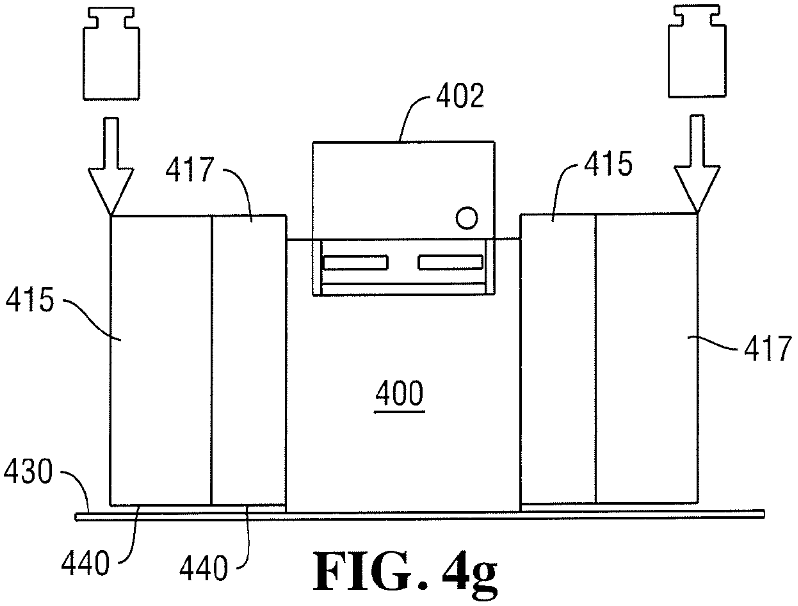

The side reinforcement portions 228, 230 each have longitudinally spaced apart apertures 338 in their respective flanges for suitable fasteners to engage for mounting the side car 214 to the side of an SST. The apertures 338 may also be used for mounting a further side car to a side car mounted to the SST. Suitable fasteners may include screws or bolts. The present invention allows for 4×M6 bolts to attach a side car 214 to the side of an SST safe enclosure housing 112 or to another side car. However, other amounts and types of suitable fastener may of course be used. Having the spaced apart apertures 338 in both side reinforcement portions 228, 230 allows a side car to be mounted to either or both sides of the SST when viewed from the front. The longitudinally spaced apart apertures 338 in each side reinforcement portion 228, 230 are identically disposed in a respective side reinforcement portion to thereby correspond with each other. Therefore, a further side car 415 (as shown in FIG. 4*e*) may be mounted to the side of a side car 417 mounted to a side of the SST 400. The longitudinally spaced apart apertures 338 also provide for indexing up or down a side car relative to the SST on which it is mounted to offer further flexibility in both module placement and customer experience. Further apertures (not shown) arranged horizontally on the safe enclosure housing may provide for additional indexing in the forward and aft directions to provide yet further flexibility to a customer.

FIGS. 4*a* to 4*g* show different configurations of slim 415 and/or standard 417 sized side car(s) in accordance with the present invention mounted to one or both sides of a SST 400 having a user interface 402 and where each side car 415, 417 is spaced apart from a surface 430 on which the SST is mounted. The bottom surface 440 of a side car 415, 417 is thus spaced apart by a distance d from the surface 430 on which the SST 400 is mounted. The height of the side car is adjustable. The side car 415, 417 can thus be mounted so that the distance d is between 0 and 50 cm. Aptly, the distance is about around 0.5 to 20 cm. Having the side car cantilevered whereby the sidecar does not rest on a floor (mounting surface 430) helps avoid structural problems and provides a highly versatile system.

Returning to FIG. 3, each side reinforcement portion 228, 230 also has longitudinally spaced apart openings 340 in its respective base 332. These openings 340 may receive and support one or more modules, trays, shelves, hooks or brackets, for example. The openings 340 provide for maximum module placement flexibility and allow module heights to comply with usability legislation for individual countries. The openings 340 may also be used for securing cabling or the like inside the outer housing 222. Cables can be readily fed onto suitable trays using a cable channel that can either be mounted above or below a module shelf.

Figure 5:
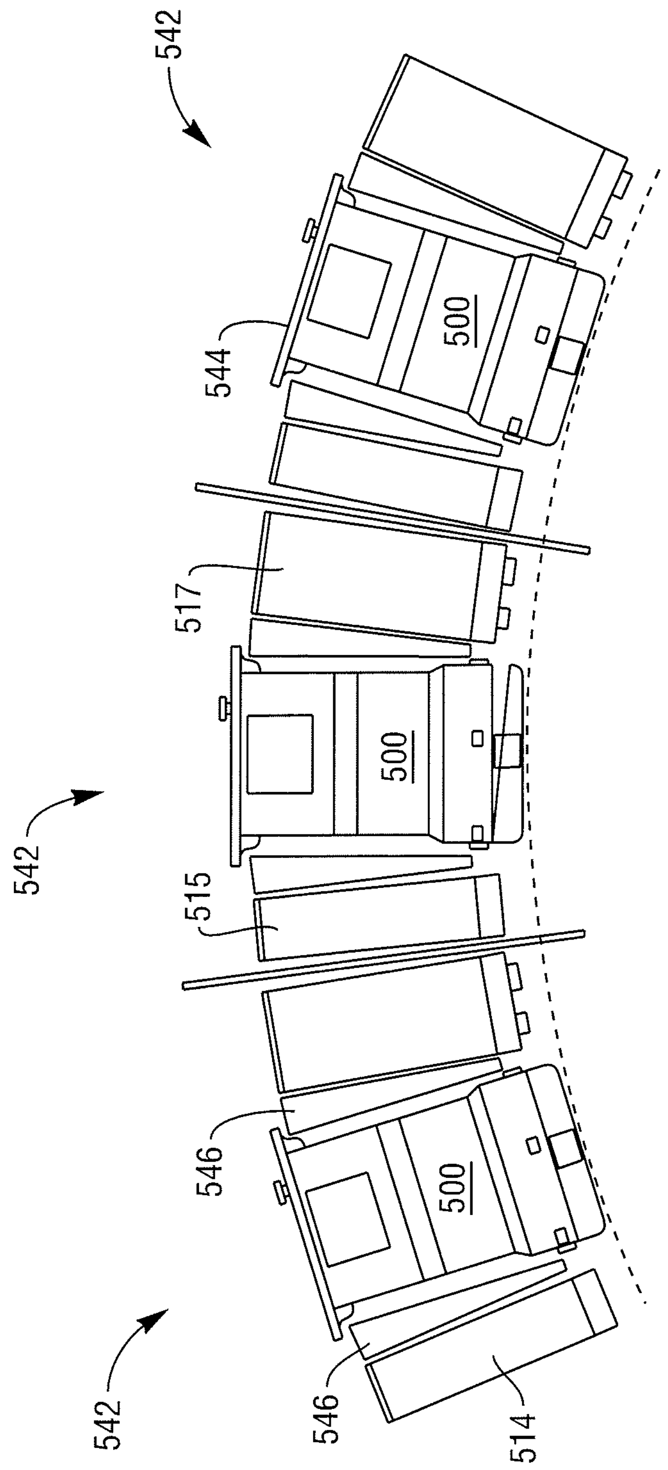
FIG. 5 illustrates a number of SSTs and respective side cars arranged in a radial configuration.

FIG. 5 illustrates a number of systems 542, wherein each system is made up of a SST 500 and a side car 514 in accordance with the present invention and of a desired size (slim 515 or standard 517), mounted to each side of the SST. The systems 542 are arranged adjacent to each other in a radial formation to define an inwardly curving arrangement, wherein respective user interfaces 544 of each SST face outwardly. To provide for such a radial arrangement, an intermediate wedge-shaped portion 546 is disposed between each side car 514 and a respective SST 500. Each wedge-shaped intermediate portion 546 may take the form of a plurality of sheet portions supported by a reinforcement assembly provided inside the outer housing. Alternatively, each intermediate portion 546 may be at least partially solid, for example. Of course, an intermediate portion 546 may be used for a single stand-alone system to orient one or more side cars at a desired angle with respect to a SST on which it is mounted.

The structural rigidity of a side car in accordance with the present invention allows each side car to be shipped mounted to a SST or similar or shipped individually. This allows for Assemble To Order (ATO) and also offers greater flexibility during installation as a side car can be separated from a respective SST for movement through doorways and/or up/down stairways, for example.

Figure 6:
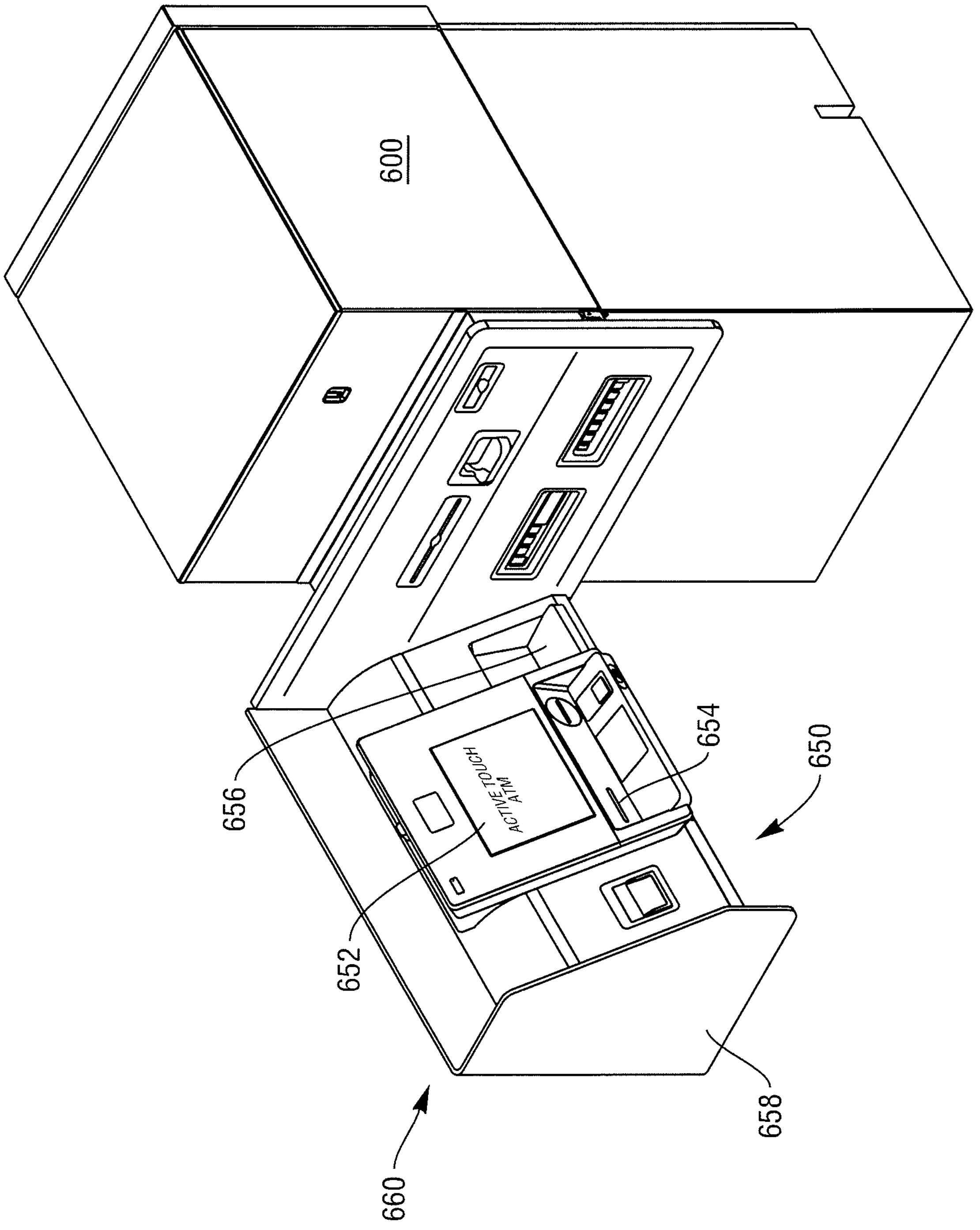
FIG. 6 illustrates an apparatus according to a further embodiment of the present invention mounted to the side of a SST.
Figure 7:
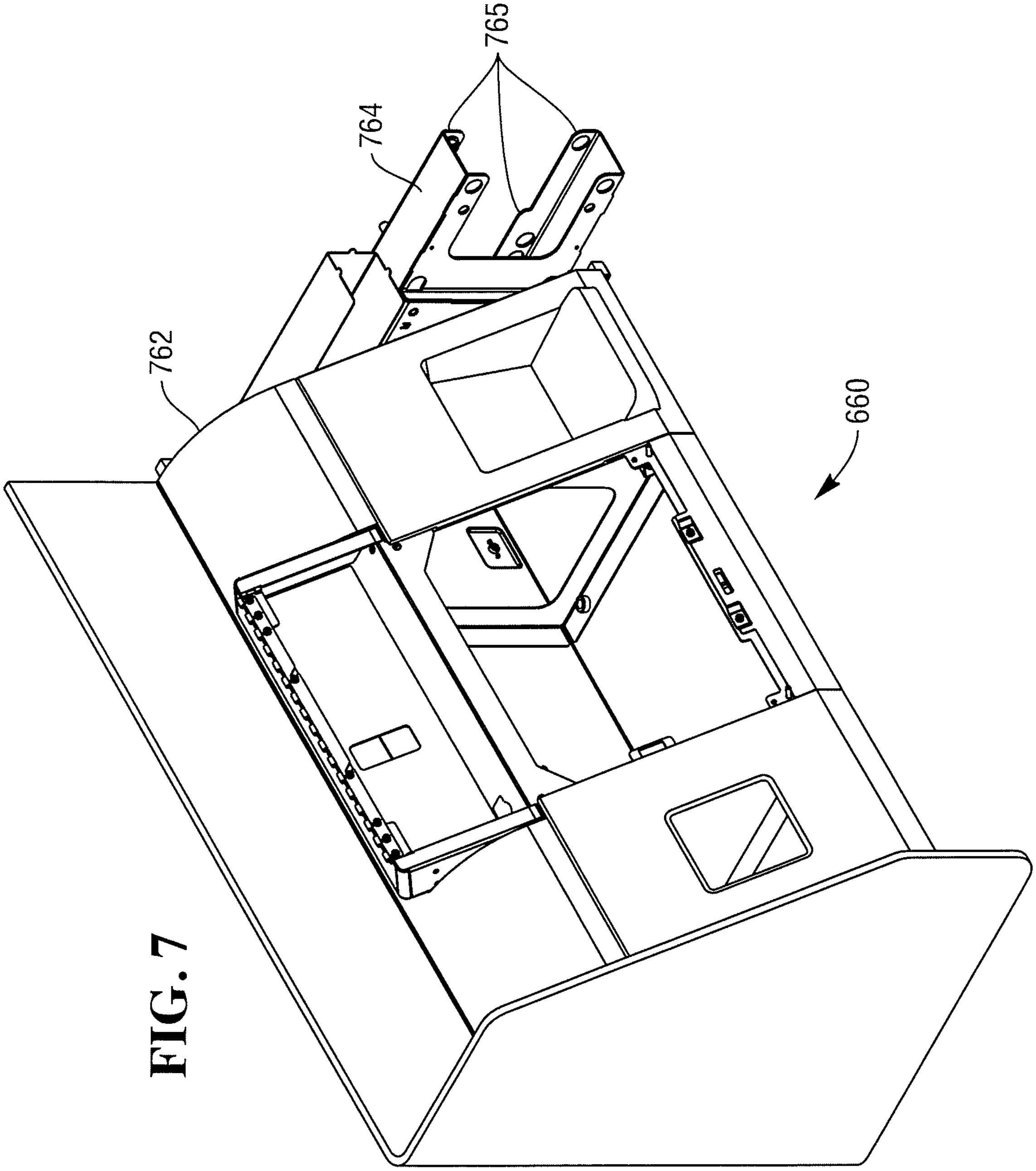
FIG. 7 illustrates further detail of the apparatus of FIG. 6.

FIG. 6 illustrates a further embodiment of the present invention. A user interface 650 is cantilevered from the side of a SST 600. The user interface 650 includes a screen 652, a media dispenser 654, a card reader/writer 656, and a communication device such as a telephone 658. All the components of the user interface 650 are supported by a support assembly 660 in accordance with the present invention which includes an outer housing 762 mounted to the side of the SST 600 by a support member 764, as shown in FIG. 7. The structure of the support assembly 660 allows different user interfaces to be selectively mounted to the outer housing 762 and different modules to be housed therein to meet a customer's particular requirements and/or a country's specific legislation. The support member 764 has mounting apertures 765 for mounting the support member 764 to the side of a SST in right or left hand configurations. The apertures 765 may conveniently be spaced apart to correspond with apertures in the safe enclosure housing of a SST to which a side car 114, as described above, is configured to attach and mount with.

Figure 8:
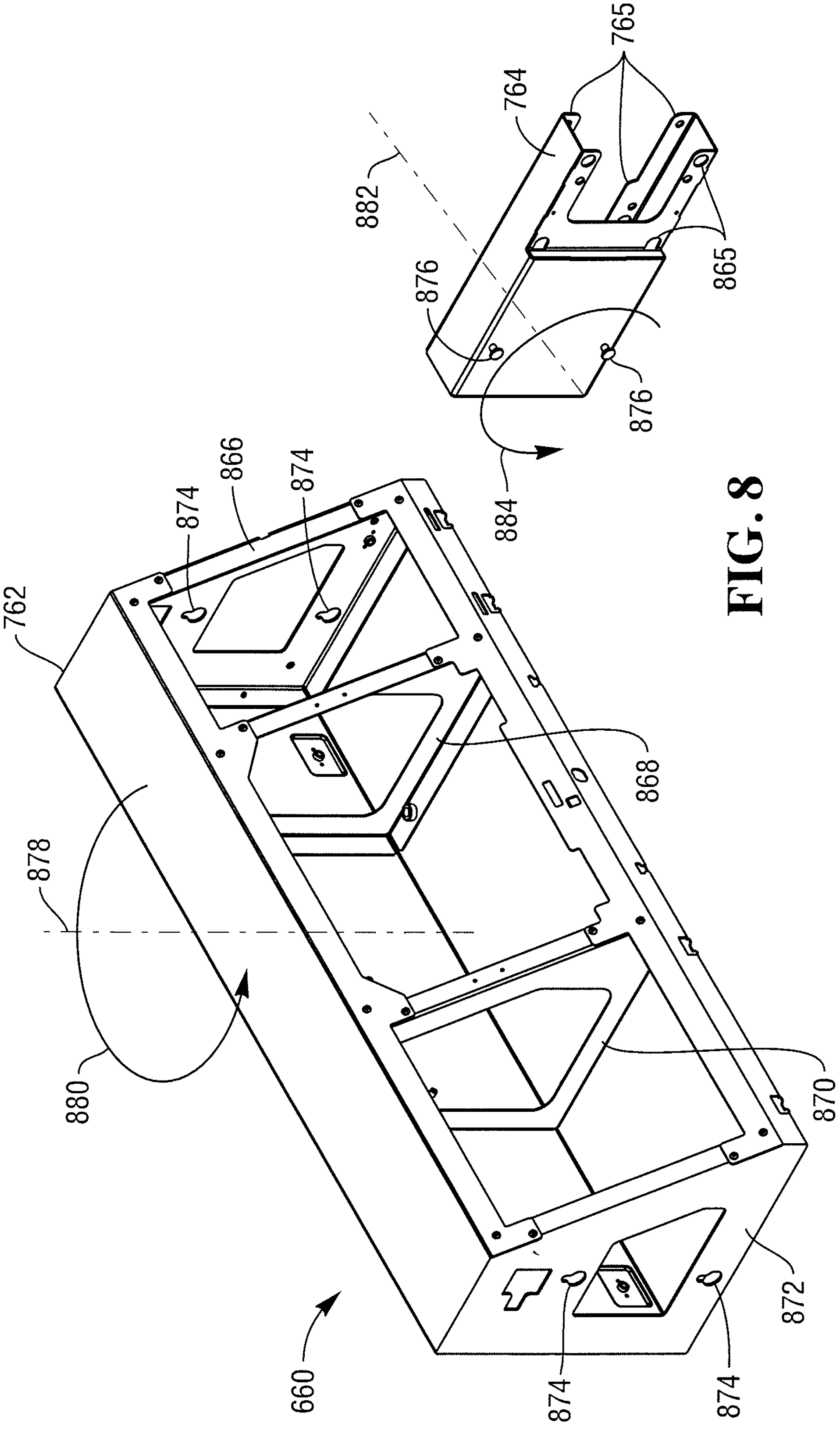
FIG. 8 illustrates the main components of the apparatus of FIGS. 6 and 7.
Figure 9A:
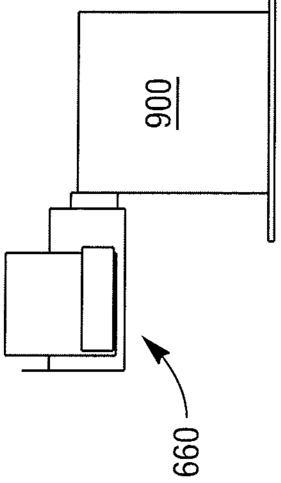
FIGS. 9*a* to 9*f* illustrate different configurations of the apparatus shown in FIGS. 6 to 8 with respect to a SST on which it is mounted.
Figure 9B:
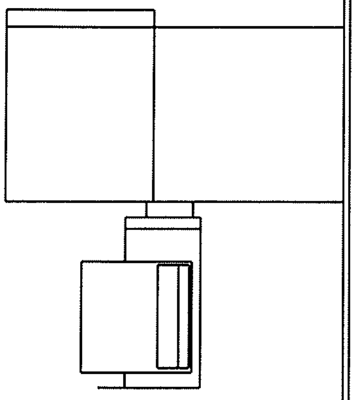
Figure 9C:
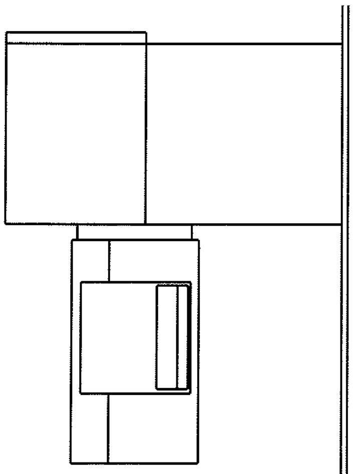
Figure 9D:
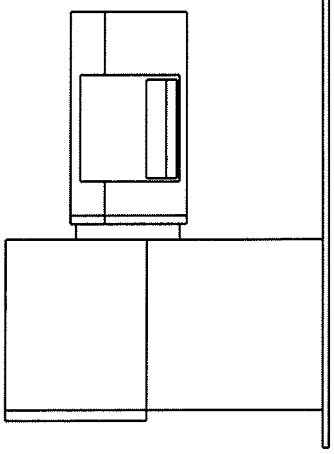
Figure 9E:
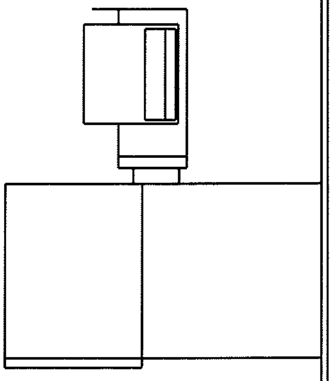
Figure 9F:
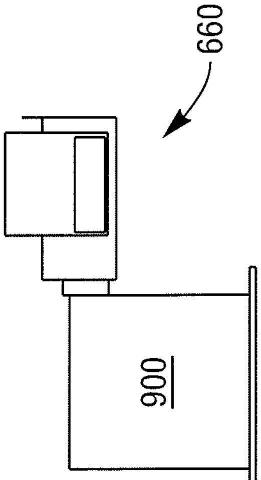

As shown in FIG. 8, a number of internal reinforcement assemblies 866, 868, 870, 872 support the outer housing 762. Each reinforcement assembly is made up of elongate reinforcement portions each having a flange for supporting and attaching a respective sheet portion of the outer housing 762 to. The two outermost reinforcement assemblies 866, 872 each have a pair of mounting apertures 874 which correspond to and receive a pair of mounting pins 876 extending outwardly from the support member 764. This allows the user interface 660 to be removably attached to the support member 764 at either of its sides. Furthermore, the support member 764 is adapted to mount to either side of a SST thereby allowing a user interface to mount on one or both sides of a SST, for example, in front and/or rear facing configurations. For example, the support assembly 660 shown in FIG. 8 may be in a front facing configuration and mounted to the left side of a SST, relative to a user interface thereof, by a respective support member 764. If a rear facing configuration is desired, the outer housing 762 is removed from its respective support member 764 and rotated 180 degrees about a vertical axis 878 as depicted by arrow 880 before being re-mounted on the support member 764. If a right-hand configuration is desired, the outer housing 762 as shown in FIG. 8 is removed from its support member 764 and the support member 764 is removed from the SST. The support member 764 is then rotated 180 degrees about a horizontal axis 882 as depicted by arrow 884 and attached to the right side of the SST before the outer housing 762 is re-mounted at its other end reinforcement assembly on to the support member 764. Some examples of differently sized user interfaces 950 and different configurations with respect to a SST 900 are shown in FIGS. 9*a* to 9*f*.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. Apparatus for mounting to the side of a safe enclosure housing of a Self-Service Terminal (SST), comprising:

a single sheet portion arranged to define an outer housing;

an intermediate portion; and a plurality of elongate reinforcement portions connected together to form at least one closed reinforcement assembly provided inside the outer housing for supporting the outer housing, the outer housing adapted to be spaced apart from the SST when mounted to the safe enclosure of the SST by up to 50 cm and the outer housing cantilevered from the SST and does not rest on a floor, the floor is a mounting surface for the SST, and wherein the outer housing configured for housing a card read/write module for the SST wherein the intermediate portion is wedged shaped and configured to orient the outer housing at an angle with respect to the SST when laced between the outer housing and the SST.

2. The apparatus as claimed in claim 1, wherein the at least one reinforcement assembly comprises at least two reinforcement assemblies longitudinally spaced apart inside the outer housing.

3. The apparatus as claimed in claim 1, wherein the at least one reinforcement assembly comprises substantially parallel and spaced apart upper and lower reinforcement portions and substantially parallel and spaced apart opposing side reinforcement portions.

4. The apparatus as claimed in claim 3, wherein the side reinforcement portions are greater in length than the upper and lower reinforcement portions.

5. The apparatus as claimed in claim 1, wherein each reinforcement portion has an open channel cross-section comprising a base portion and opposing side wall portions extending from the base portion to a channel opening.

6. The apparatus as claimed in claim 5, wherein the base portion and channel opening of a lower reinforcement portion arc further spaced apart than the corresponding base portions and channel openings of a remainder of the reinforcement portions of the at least one reinforcement assembly.

7. The apparatus as claimed in claim 5, wherein each reinforcement portion comprises at least one outwardly extending flange at its channel opening for supporting a portion of the single sheet portion of the outer housing.

8. The apparatus as claimed in claim 3, wherein each side reinforcement portion comprises at least one aperture for selectively mounting the apparatus in a forward facing orientation to one or both sides of a safe enclosure housing of an ATM or SST.

9. The apparatus as claimed in claim 4, wherein each side reinforcement portion comprises a plurality of longitudinally spaced apart apertures for supporting a shelf, tray and/or module.

10. A system comprising a self-service terminal (SST) and at least one apparatus as claimed in claim 1 mounted to at least one side of the SST.

11. The system as claimed in claim 10, wherein the apparatus is spaced apart from a surface on which the SST is mounted.

12. An assembly comprising a plurality of the systems as claimed in claim 10.

13. The assembly as claimed in claim 12, wherein the plurality of the systems are arranged adjacent to each other in a radial formation to define an inwardly or outwardly curving arrangement.

14. A method of manufacturing apparatus for mounting to the side of a safe enclosure housing of a Self-Service Terminal (SST), comprising:

providing a plurality of elongate reinforcement portions;

connecting the reinforcement portions to form at least one closed reinforcement assembly;

providing a wedge-shaped intermediate portion; and attaching at least one sheet portion to each reinforcement portion to form an outer housing to be supported by the at least one closed reinforcement assembly, and mounting the apparatus to the safe enclosure of the SST with the mounted apparatus spaced apart from the safe enclosure up to 50 cm and cantilevering the mounted apparatus from the SST and preventing the mounted apparatus from resting on a floor that serves as a mounting service for the SST, and wherein interacting with a card read/write module of the SST occurs through the mounted apparatus and placing the wedge-shaped intermediate portion between the SST and the apparatus to orient the apparatus at an angle with respect to the SST.

15. Apparatus for mounting to the side of an enclosure, comprising:

an outer housing;

a wedge-shaped intermediate portion; and at least one inner reinforcement assembly for supporting the outer housing from the enclosure and wherein the apparatus is adapted to be spaced apart from a surface on which the enclosure is mounted to the safe enclosure by up to 50 cm, and wherein the apparatus is cantilevered from the enclosure and does not rest on a floor that is a mounting surface for the enclosure, and wherein the enclosure for a Self-Service Terminal (SST), and wherein the outer housing configured for housing a card read/write module of the SST, wherein the intermediate portion is wedged shaped and configured to orient the outer housing at an angle with respect to the SST when placed between the outer housing and the SST.

* * * * *